Dec. 30, 1930.    E. L. STANTON    1,786,678
TRAFFIC STOP
Filed March 19, 1930
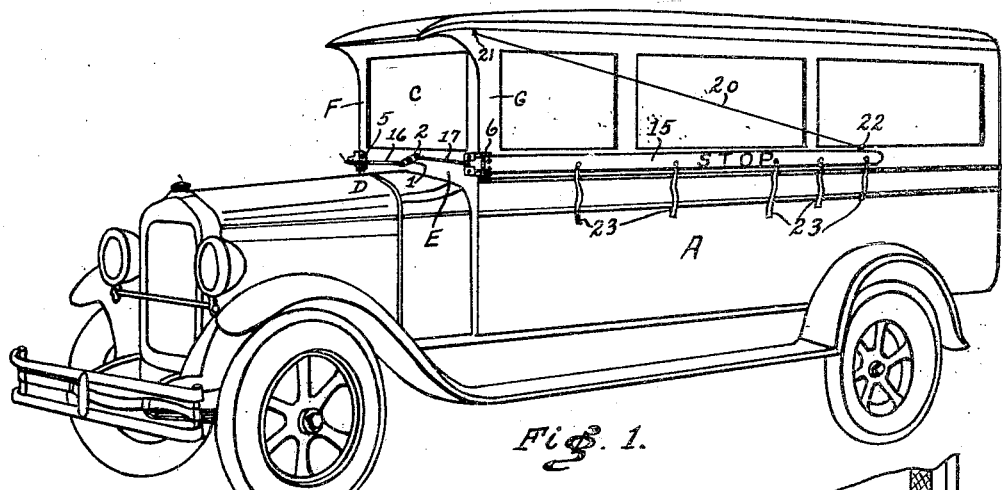
Fig. 1.
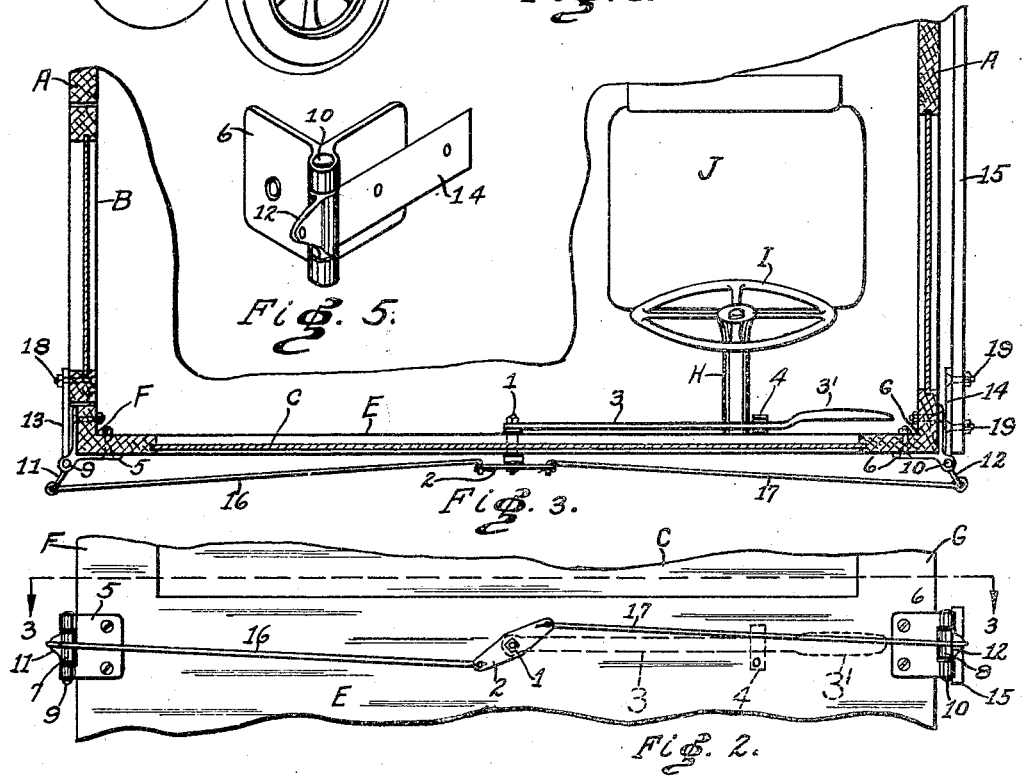
Fig. 5.
Fig. 3.
Fig. 2.
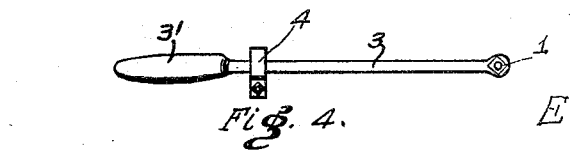
Fig. 4.
Inventor:
Edgar L. Stanton;
By Robert W. Caudle,
Attorney.

Patented Dec. 30, 1930

1,786,678

UNITED STATES PATENT OFFICE

EDGAR L. STANTON, OF UNION COUNTY, INDIANA

TRAFFIC STOP

Application filed March 19, 1930. Serial No. 437,250.

The object of my present invention, is the provision of an assembly to be connected with vehicles, having means for signaling other traffic to stop while the vehicle to which it is connected is loading or unloading passengers, the same being simple in its construction, easy of operation, strong and durable in its several parts, and which can be manufactured, installed, and sold at a comparatively low price.

More specifically stated, this invention is especially intended to be employed in connection with school hacks, or other public vehicles engaged in transferring passengers, with relation to which the law prohibits other vehicles from passing during the transfer of its passengers into or from the vehicle, the construction of the invention being such that the roadway will be blocked when the vehicle-door is open, in order to compel attention of the thoughtless or ignorant and to curb the defiant from passing it when the vehicle to which it is connected is taking on or is discharging passengers.

Other objects and particular advantages of my invention will be suggested in the course of the following description.

One manner of carrying out the principles of my invention in a practical, efficient, and economical way, is shown in the accompanying drawings, in which—Figure 1 is a perspective view of a vehicle equipped with my invention, showing the stop-arm out of operative position. Figure 2 is a front elevation of a portion of the vehicle, showing my invention in elevation, and taken on an enlarged scale from that of Fig. 1. Figure 3 is a cross section, showing a portion of a vehicle with my invention in connection therewith, showing a plan view thereof, and as taken on the line 3—3 of Fig. 2. Figure 4 is a detail view of the operating lever and its connections. And Figure 5 is an isometrical view of one of the corner mechanisms.

Similar indices denote like parts throughout the several views.

In order that the construction, the operation, and the several advantages of my invention may be more fully comprehended and appreciated, I will now take up a detailed description thereof, in which I will set forth the same as comprehensively as I may.

The following mentioned parts, which are indicated by letters of reference, are shown merely to make clear the purposes and the operation of my invention, the parts of the latter being indicated by numerals.

In the drawings letter A denotes the body of a public vehicle, such as a bus or school-hack, the same having a door B located on the right-hand side of the body and at the front end thereof.

The body of the vehicle has a transparent wind-shield C extending across its front and located above the motor enclosure or hood D, with a panel E extending across the front between the corner-posts F and G and located between the wind-shield C and the hood D.

Letter H designates the steering-post, and letter I denotes the steering-wheel, by which the vehicle may be guided. And letter J denotes the driver's seat.

The invention proper comprises a short shaft 1, which is revolvably mounted in horizontal position in the center of the panel E, one end thereof projecting forward beyond the panel and its other end projecting rearward beyond the panel. Rigidly secured on the forward end of said shaft is the equalizing plate 2, with an aperture formed near each end thereof, which apertures are equidistant from the center of the shaft 1. Secured on the projecting inner end of the shaft 1 is the operating lever 3, which extends at right-angles from said shaft, and having a handle 3' attached to its free or outer end. Secured to the inner face of the panel E is a spring-catch 4 to engage the said lever 3 and lock it, removably, in horizontal position.

Numerals 5 and 6 denote corner plates, which are identical with each other, and they fit around the corners of the respective posts F and G, and in alignment with the shaft 1. A cylindrical stem is pivoted in the angularly extending portion of each of said plates 5 and 6, said stems being designated by the numerals 7 and 8, respectively, and they are rotatable horizontally on their respective pintles 9 and 10 which are carried by the said angular extensions portions. The stems 7 and 8 each carries a projecting arm, 11 and 12 respectively. Also each of said stems 7 and 8 carries a projecting plate or bar, 13 and 14 respectively. The plate 13, in this instance, is secured to the door B, while the plate 14 is secured to the stop-bar 15, hereinafter explained. The stem 7, the arm 11 and the plate 13, are formed integral with each other, while the arm 11 and the plate 13 extend outward at an obtuse angle with relation to each other. In like manner the stem 8, the arm 12, and the plate 14 are formed integral with each other, while the arm 12 and the plate 14 extend outwardly at an obtuse angle with relation to each other. Numerals 16 and 17 designate the connecting rods, the inner ends of which are pivoted in the respective apertures formed in the end portions of the plate 2, and their outer ends are hooked into the apertures formed therefor in the outer end portions of the respective arms 11 and 12.

The plate 13 is rigidly secured to the door B by means of the bolts 18, and said plate and its pivot 9 may form one of the hinges of the door B, or separate hinges may be employed for the door but they must have their pivots in alinement with pivot 9.

In a similar manner the plate 14 is connected with the stop-bar 15 by means of the bolts 19, or otherwise as desired.

It is to be understood that the lever 3 is secured to the shaft 1 in such relation that when the lever 3 is turned to the left, in horizontal position as shown, the door B will be closed and the stop-arm 15 will be located flat against the side of the body A.

Numeral 20 denotes the guy wire, one end of which is secured to the eyelet 21 which is attached near the top of the body of the vehicle and directly above the plate 6, or nearly so. The other end of the guy wire is secured to the eyelet 22 which is carried by the outer portion of the stop-bar 15, whereby said bar is always retained in horizontal position but is adapted to swing laterally. Attached to and extending loosely down from the stop-bar 15 are a plurality of streamers 23, such as red fabric or other bright material, whereby they may be easily seen.

It will now be seen that when the vehicle with which my invention is installed, is traveling along the road, the door B will be closed and the bar 15 will be turned back flat against the side of the vehicle body, and at the same time the lever 3 will be turned to horizontal position, as shown. If now the vehicle should stop, and it be desired to discharge or take on passengers, then the driver has only to draw the vehicle over to the right-hand side of the road and then turn the lever 3 to the right, bringing it to vertical position, which of course will automatically open the door and at the same time will swing the bar 15 across the roadway at the left of said vehicle, thereby blocking the roadway against other vehicles traveling in either direction, and thereby accomplishing the paramount object of this invention.

It is to be understood that in place of the door a second bar 15 may be connected with the plate 5, whereby the operation of the lever 3 will turn both of said bars, in place of one bar and the door. Or, if desired, the mechanism which operates or is connected with the door, or with the bar which may be located at the right-hand side of the shaft 1, may be omitted, whereby the operations of the lever 3 will operate only the bar 15 at the left.

I desire that it be understood that various changes may be made in the several details herein shown and described, without departing from the spirit of this invention and without sacrificing any of the advantages thereof which are new and useful.

Having now fully shown and described my invention, what I claim, and desire to secure by Letters Patent of the United States, is—

1. A traffic stop comprising a shaft, a lever secured to one end of said shaft, an elongated plate secured to the other end of said shaft with an aperture formed through each extremity thereof, which apertures are equidistant from said shaft, a rod pivoted in each of the said apertures in said plate and extending laterally and in directions opposite to each other, a bell-crank pivoted to be operated by the operation of said lever through said rods with said bell-cranks operating in directions opposite to each other, and an element adapted to be swung laterally by each of said bell-cranks.

2. In combination with a vehicle having a door at one side thereof, a stop-bar hinged at one end to a front corner of the vehicle on the side opposite from said door, a lever located within reach of the driver of the vehicle and having means whereby the operation of said lever in one direction will simultaneously swing said stop-bar out at right-angles to the vehicle and open said door.

3. In combination with a vehicle having a door at one side thereof which is adapted to open by swinging outward and forward, a stop-bar hinged to the opposite side of the vehicle and adapted to swing outward and forward, a lever located within reach of the driver of the vehicle and having means whereby the operation thereof will simultaneously swing said door and said stop-bar in directions opposite to each other.

4. In combination with a vehicle having a door at one side thereof, a stop-bar hinged at one end to the corner of the vehicle on the opposite side from the door, a lever located within reach of the driver of said vehicle and having means connected therewith whereby the operation of said lever will open the door and swing the stop-bar out at right-angles to the vehicle.

5. In combination with a vehicle having a door hinged at one side thereof, a stop-bar hinged at its inner end to the corner of the vehicle on the opposite side thereof from said door, a shaft extending through the front of the vehicle, a lever secured to the inner end of said shaft, a plate secured to the outer end of said shaft, connecting-rods pivoted at their inner ends to said plate at points removed from and equi-distant from said shaft, an arm extending from each of said hinge connections of the door and said bar with the outer ends of said rods pivoted to the respective arms whereby the operation of said lever will simultaneously open the door and swing the stop-bar out at right-angles to the vehicle, and conversely, when said lever is moved in the other direction causing the door to close and turn the stop-bar back into contact with the side of the vehicle.

6. In combination with a vehicle having a door hinged at one side thereof, a stop-arm hinged to the side opposite to said door and adapted to swing outward at right-angles to the vehicle, a guy for suspending the outer portion of the arm, a lever located inside the vehicle and adapted to swing said arm and door outward or backward parallel with the vehicle, and a catch for securing said lever when the arm is turned back parallel with the vehicle.

In testimony whereof I have hereunto subscribed my name.

EDGAR L. STANTON.